United States Patent [19]

Brand et al.

[11] Patent Number: 4,957,888

[45] Date of Patent: Sep. 18, 1990

[54] METHOD OF MANUFACTURING CERAMIC POWDERS HAVING THE PEROVSKITE STRUCTURE

[75] Inventors: Hans-Wolfgang Brand; Detlef F. K. Hennings, both of Aachen; Mareike K. Klee, Hückelhoven-Brachelen; Herbert J. Scheinemacher, Aachen, all of Fed. Rep. of Germany

[73] Assignee: U.S. Philips Corporation, New York, N.Y.

[21] Appl. No.: 230,647

[22] Filed: Aug. 10, 1988

[30] Foreign Application Priority Data

Aug. 17, 1987 [DE] Fed. Rep. of Germany ....... 3727396

[51] Int. Cl.$^5$ ...................... C04B 35/46; C04B 35/48
[52] U.S. Cl. ..................................... 501/134; 501/102; 501/135; 501/136; 423/598; 423/608
[58] Field of Search ............... 501/102, 134, 135, 136; 423/598, 608

[56] References Cited

U.S. PATENT DOCUMENTS 4,677,083  6/1987  Uedaira et al. ..................... 501/135

FOREIGN PATENT DOCUMENTS

| 61-136958 | 6/1986 | Japan | 501/135 |
| 61-136959 | 6/1986 | Japan | 501/135 |
| 62-059528 | 3/1987 | Japan | 501/134 |
| 62-132708 | 6/1987 | Japan | 501/135 |
| 63-085014 | 4/1988 | Japan | 501/134 |

Primary Examiner—Mark L. Bell
Assistant Examiner—Anthony J. Green
Attorney, Agent, or Firm—Norman N. Spain

[57] ABSTRACT

A method of manufacturing ceramic powders having the perovskite structure by means of a reaction in an aqueous solution, in which a homogeneous aqueous solution comprising a strong organic base and comprising at least one alkaline-earth metal salt and at least one zirconium salt and/or at least one titanium salt is converted at a reaction temperature in the range from 70° to 150° C., and water adhering to the reaction product is removed, or in which an alkaline-earth metal-titanium-acetate gel having a strong organic base is converted at a reaction temperature in the range from 110°–180° C., and water adhering to the reaction product is removed.

12 Claims, 2 Drawing Sheets

METHOD OF MANUFACTURING CERAMIC POWDERS HAVING THE PEROVSKITE STRUCTURE

BACKGROUND OF THE INVENTION

The invention relates to a method of manufacturing ceramic powders having the perovskite structure by means of a reaction in an aqueous solution.

Ceramic powders having the perovskite structure are an important starting material for the manufacture of widely varying electronic components such as, for example, multilayer capacitors or non-linear resistors having a positive temperature characteristic. The demand for continuously improving electronic components as well as a better process control in the manufacture of these components imposes high requirements on the starting materials.

The mixed-oxide method is still predominantly used in the industrial production of perovskite compounds such as, for example, $BaTiO_3$ powders, to produce such powders barium carbonate and titanium dioxide are mixed in mills and converted into $BaTiO_3$ in a solid-state reaction at a temperature $\geq 1000°$ C. A disadvantage of this method is that high reaction temperatures and grinding processes are required. Aggregation of the powder particles is brought about by calcining at temperatures of approximately 1000° C. and higher, as a result of which coarse-grained powders are obtained. These powders must be reduced in size by means of grinding processes. However, it is very difficult to obtain particle sizes of $<1\mu m$. Due to aggregation of the particles an undesirably wide particle-size distribution is obtained. Moreover, due to abrasion in the grinding processes impurities are introduced into the powder.

DE-OS 35 26 674 describes a method of manufacturing a mass containing perovskite compounds, in which method perovskite compounds of the general formula $ABO_3$, for example, $BaTiO_3$, are used, according to this patent the following hydrothermal reactions are employed.

A. Reaction of a mixture consisting of an alkoxide containing an A-group element with an alkoxide containing a B-group element and with water at a temperature of approximately 80° C., and the subsequent conversion at reaction temperatures of 150° C.

B. Reaction of a hydroxide containing the A-group element with an alkoxide containing the B-group element, as described under A.

C. Reaction of a hydroxide containing the A-group element with a hydroxide, containing the B-group element, as described under A.

D. Reaction of a hydroxide containing the A-group element with a salt containing the B-group element, as described under A.

E. A mixture containing the A-group element and the B-group element as a salt, is converted with alkali hydroxides, applying the conditions as described under A.

In the reactions under A and B alkoxides are used which are very sensitive to hydrolysis; this has the disadvantage that storage and preparation must take place under an inert gas atmosphere exluding $H_2O$, $O_2$ and $CO_2$. Thus, this process is relatively costly. The reactions described under B and C have the additional disadvantage that the starting materials are not made to react in a homogeneous solution, which leads to the formation of inhomogeneities in the end product.

The reaction as described under E has the disadvantage that alkaline compounds are required for the reaction. It has been found that the electric properties of ceramic powders manufactured in the above-described manner do not meet all requirements.

SUMMARY OF THE INVENTION

It is an object of the invention to provide a method of manufacturing ceramic powders having the perovskite structure, which method may be carried out in a simple manner and, hence, involves low costs, and which permits the manufacture of, in particular, fine, highly pure powder particles having a round particle shape and a small particle-size distribution.

This object is achieved in accordance with the invention by a method in which a homogeneous, aqueous solution having a strong organic base and comprising at least an alkaline-earth metal salt and at least a Zirconium salt and/or at least a titanium salt is converted at a reaction temperature in the range from 70° to 150° C., water adhering to the reaction product being removed, or in which an alkaline-earth metal-titanium-acetate-gel having a strong organic base is converted at a pressure of $\approx 5$ bar and a reaction temperature of $\approx 150°$ C., the water adhering to the reaction product being removed.

DETAILED DESCRIPTION OF THE INVENTION

Figure 1:
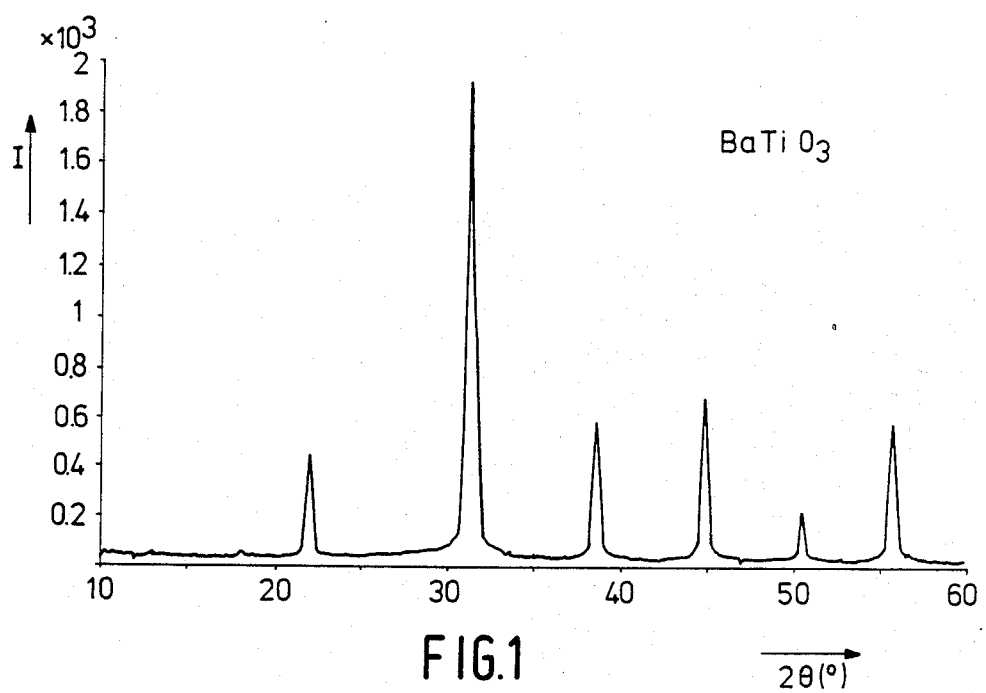
FIGS. 1 to 5 are x-ray diffraction diagrams of powders having the peraskite structure which are manufactured according to the method of the invention. In the diagrams the intensity of the x-ray diffraction 1 is indicated as a function of the diffraction angle 2.

The advantages achieved by means of the invention consist in particular in that high reaction temperatures and grinding processes leading to an aggregation of the powder particles and, moreover, to the introduction of impurities into the powder are avoided. A further advantage consists in that the starting components are made to react in a homogeneous solution. These are ideal conditions for the manufacture of a homogeneous powder.

A still further advantage of the method in accordance with the invention is that the formation of very fine powders (average particle size $0.03\mu m$) can be attained at very low reaction temperatures (80° C.). The reaction in an aqueous solution at a temperature of, for example, 80° C. allows the use of a normal pressure. The particle size can be reproducibly adjusted to values up to $\approx 0.2$ $\mu m$ by varying the process parameters such as, for example, raising the reaction temperature and building up a pressure in a pressure vessel. By means of the method in accordance with the invention not only can alkaline earth metal titanates or alkaline earth metal zirconates having the perovskite structure be manufactured but also solid solutions having the perovskite structure such as, for example, $(Ba,Sr)TiO_3$ or $Ba(Ti,Zr)O_3$ can be manufactured. Besides pure $BaTiO_3$, these materials also have a substantial importance in the manufacture of dielectric substances. For example, it is also possible to substitute a part of the alkaline-earth metal content with lead. Such perovskites can suitably be used in the manufacture of nonlinear resistors having a positive temperature characteristic, in particular, at relatively high temperatures.

The method in accordance with the invention has the further advantage that no expensive alkoxides are used as starting materials. The compounds used in the present method do not have to be stored and converted under an inert gas atmosphere so that the raw materials and the process are more economical and less intricate than, for example, the method known from DE-OS 35 26 674 (reactions A and D). Unlike the method (reactions C and D) known from DE-OS 35 26 674, barium halogenides ($BaCl_2$) are used in the present method instead of barium halides, thereby rendering purification of the hydroxides of barium carbonate superfluous which reduces the process costs.

An advantage of the present method is that strong organic bases, preferably amines, such as tetramethyl ammonium hydroxide $(CH_3)_4N-OH$ are used for the reaction of the starting materials. In this way, contamination with alkali ions of the ceramic powder obtained is prevented.

The invention will be described in more detail by means of exemplary embodiments and with reference to the drawing.

In accordance with the examples 1 to 4 described hereinbelow, powders having the perovskite structure are manufactured as follows:

EXAMPLES 1.

10.05 g of an aqueous titanium oxychloride solution containing 18.88% by weight of $TiO_2$ are weighed out together with 11.544 g of $BaCl_2.2H_2O$ in a three-neck bottle of quartz-glass. In order to completely dissolve the barium chloride 50 ml of $CO_2$-free water are added at room temperature. 68.6 g of an aqueous solution containing 25% by weight of tetramethyl ammonium hydroxide are added dropwise to the homogeneous solution while stirring vigourously. The suspension obtained is heated to a temPerature of 80° C. and is made to react at this temperature for 138 hours while stirring. In order to remove chlorine ions, excess barium ions as well as tetramethyl-ammonium ions, the reaction product obtained is washed three times with 100 ml of $CO_2$-free boiling water, two times with 25 ml of 0.1 M aquous acetic acid and four times with $CO_2$-free water, after which the water is decanted. Water adhering to the powder surface is removed by washing with ethanol.

The X-ray diffraction diagram of the reaction product, in shows that apart from $BaTiO_3$ there are no further phases. The average particle size is 0.046 μm, as was established by means of scanning microscopy. Owing to the small particle size the structure of the $BaTiO_3$ powder is cubic or pseudo cubic.

EXAMPLE 2.

2.00 g of an aqueous titanium oxychloride solution containing 18.88% by weight of $TiO_2$ are weighed out with 2.31 g of $BaCl_2.2H_2O$ in a quartz-glass flask. In order to completely dissolve the barium chloride 10 ml of $CO_2$-free water are added at room temperature while stirring. Within 15 minutes M. 13.76 g of an aqueous solution containing 25% by weight of tetramethyl ammonium hydroxide is added dropwise to this homogeneous solution while stirring vigourously. The solution obtained is converted in a decomposition vessel at a temperature of 150° C. After a reaction time of 100 hours the liquid phase is decanted and the reaction product is washed six times with 50 ml of $CO_2$-free boiling water. Subsequently, the reaction product is washed with 10 ml of an 0.1 M aqueous acetic acid and four times with 50 ml of $CO_2$-free boiling water, after which the water is decanted. Water adhering to the surface of the reaction product is removed by washing with 30 ml of ethanol.

Figure 2:
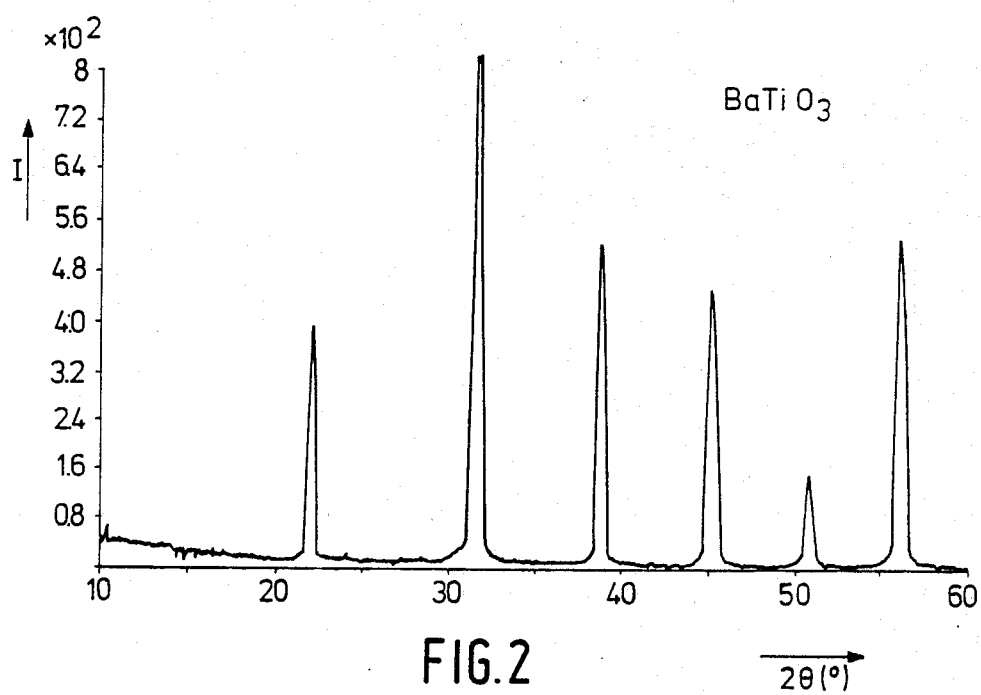

The X-ray diffraction diagram of the reaction product in FIG. 2 shows no other phases than $BaTiO_3$. The average particle size is 0.11 μm. Also in this case, the structure of the $BaTiO_3$ powder obtained is cubic or pseudo-cubic.

EXAMPLE 3.

2.4290 g of an aqueous titanium oxychloride solution containing 18.88% by weight of $TiO_2$, 0.4107 g of $ZrOCl_2.6H_2O$ and 1.7526 g of $BaCl_2.2H_2O$ are dissolved in 10 ml of $CO_2$-free water at room temperature. Within 15 minutes 14.659 g of an aqueous solution containing 25% by weight of tetramethyl ammonium hydroxide are added dropwise to this homogeneous solution while stirring vigourously. The suspension obtained is converted in a decomposition vessel at a temperature of 150° C.

After a reaction time of 24 hours the liquid phase is separated from the reaction product and the reaction product is washed six times with 50 ml of $CO_2$-free boiling water after which the water is decanted. Water adhering to the surface of the reaction product is removed by drying in a drying cupboard at a temperature of 100° C.

Figure 3:
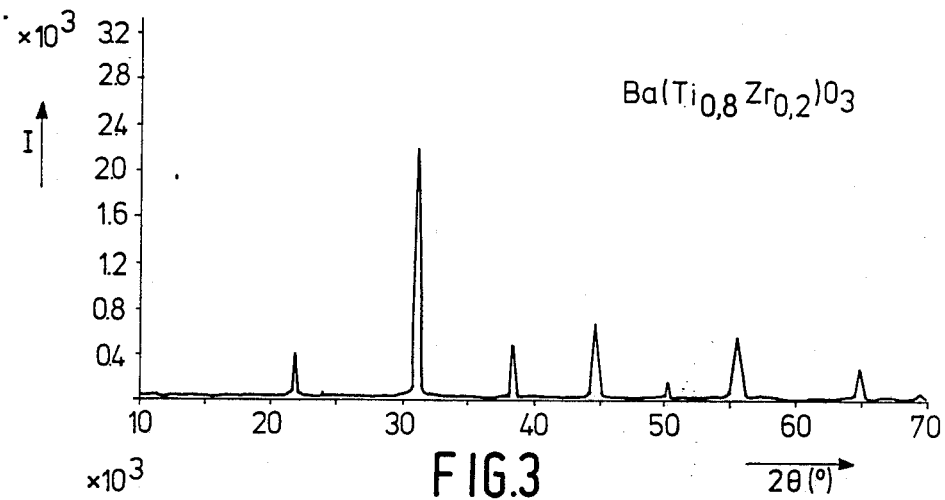

As is shown in the X-ray diffraction diagram of FIG. 3, the powder obtained has a cubic to pseudo cubic perovskite structure. It may be derived from the lattice constant that the only phase formed is a solid solution $Ba(Ti_{0.8}Zr_{0.2})O_3$. Owing to the insertion of the larger zircon into the lattice sites of titanium in the $BaTiO_3$ lattice, an expansion of the cubic $BaTiO_3$-lattice cell can be observed. The cubic lattice constant was fixed at a=4.052.

EXAMPLE 4.

2.5816 g of an aqueous titanium oxychloride solution containing 18.88% by weight of $TiO_2$, 1.1921 g of $BaCl_2.2H_2O$ and 0.3253 g of $SrCl_2.6H_2O$ are dissolved in 9 ml of $CO_2$-free water at room temperature. Within 15 minutes 13.323 g of an aqueous solution containing 25% by weight of tetramethyl ammonium hydroxide are added dropwise to this homogeneous solution while stirring vigorously. The suspension obtained is converted in a decomposition vessel at a temperature of 150° C. After a reaction time of 24 hours the liquid phase is decanted and the reaction product is washed six times with 50ml of $CO_2$-free boiling water, after which the water is decanted. The reaction product is dried in a drying cupboard at a temperature of 100° C.

Figure 4:
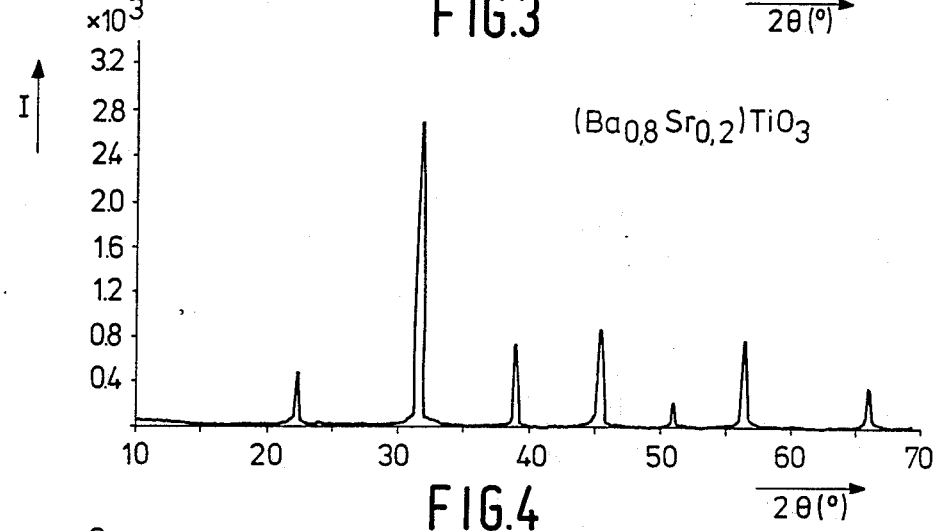

As is shown in the X-ray diffraction diagram of FIG. 4, the powder obtained has a cubic to pseudo-cubic perovskite structure. It can be derived from the lattice constant that the only phase formed is a solid solution $Ba_{0.8}Sr_{0.2}TiO_3$.

Owing to the insertion of the smaller strontium into the lattice sites of barium, a reduction of the $BaTiO_3$-lattice cell can be observed. The cubic lattice constant was fixed at a=3.998.

In the examples 1 to 4 as described above, a Ba-excess in the reaction of from 50 to 100% was used to increase the $BaTiO_3$ yield or to produce a stoichiometric phase having an atomic ratio of Ba:Ti=1:1.

By means of the following 5th example a method is described for manufacturing BaTiO$_3$ without a Ba-excess and without chlorine ions, the Ba:Ti ratio being >0.98, in a hydrothermal reaction at a temperature in the range from 110°-180° C. To this end, barium-titanium-acetate gels having an atomic ratio Ba:Ti=1:1 are converted into BaTiO$_3$ in the strongly alkaline medium of an aqueous tetramethyl ammonium hydroxide solution. The use of barium acetate has the advantage that chlorine ions are eliminated which as is known, are inserted in small quantities into the sites of the oxygen ions in the perovskite lattice where, as donors and in quantities as small as 100 ppm, they can reduce the electrical insulation capacity of ceramics manufactured from such powders.

A further advantage of the use of acetate gels is that the barium ions and titanium ions in the gel are quasi fixed and can react with one another at a very short distance. Barium acetate and titanium acetate are homogeneously mixed in an acetic acid aqueous solution.

Dependent upon the acetic acid content the clear homogeneous mixture gels by itself, typically, after a period of 8 to 9 hours. Clear transparent gels are obtained having a homogeneous distribution of barium ions and titanium ions. Even if a certain segregation of barium ions and titanium ions should take place in atomic dimensions the mixture can still be qualified as quasi homogeneous. If the gel is heated in an alkaline environment BaTiO$_3$ is formed having a Ba:Ti ratio >0.98.

EXAMPLE 5.

1. Manufacture of the gel:

50 g of tetrabutyl titanate Ti(OC$_4$H$_9$)$_4$ are mixed with 26.5 g of acetic acid CH$_3$COOH. The titanium content of the solution obtained is gravimetrically determined as TiO$_2$. 10 g of the solution contain 1.534 g of TiO$_2$ (corresponding to 0.0192 mol of Ti).

4.981 g of barium acetate Ba(CH$_3$COO)$_2$ are dissolved in 6.7 g of water and 4.69 g of acetic acid CH$_3$COOH at a raised temperature. After cooling to room temperature the barium acetate solution is mixed with 10.152 g of the titanium acetate solution.

In the barium-titanium-acetate solution the atomic ratio Ba:Ti is approximately 1:1. After a period of 8 to 9 hours at room temperature the barium-titanium-acetate solution has been converted into a transparent, ream-free, yellowish gel. After calcination at a temperature of ≈1000° C. the BaTiO$_3$ content of such a gel is 0.172 g per 1 g of gel.

2. Manufacture of BaTiO$_3$ from the gel:

5.9 g of gel and 25 g of an aqueous solution of 6.25 g tetramethyl ammonium hydroxide (CH$_3$)$_4$N—OH (corresponds to 25% by weight of tetramethyl ammonium hydroxide) are introduced into an inert synthetic resin vessel which can be closed and which is introduced into a steel container under pressure.

The arrangement corresponds to a commercially available device used to carry out chemical analyses, in which slightly soluble compounds are decomposed at raised temperatures.

The gel is heated for a period of 17 hours at a temperature of 150° C. at an excess pressure of approximately 5 bar. After completion of the reaction and cooling of the reaction mixture the liquid is decanted from the synthetic resin vessel and the precipitate is washed with hot (70°) water and, finally, with denatured ethanol.

After drying an 98% yield of very fine grained BaTiO$_3$ having an average particle size of 0.1 μm is obtained.

Figure 5:
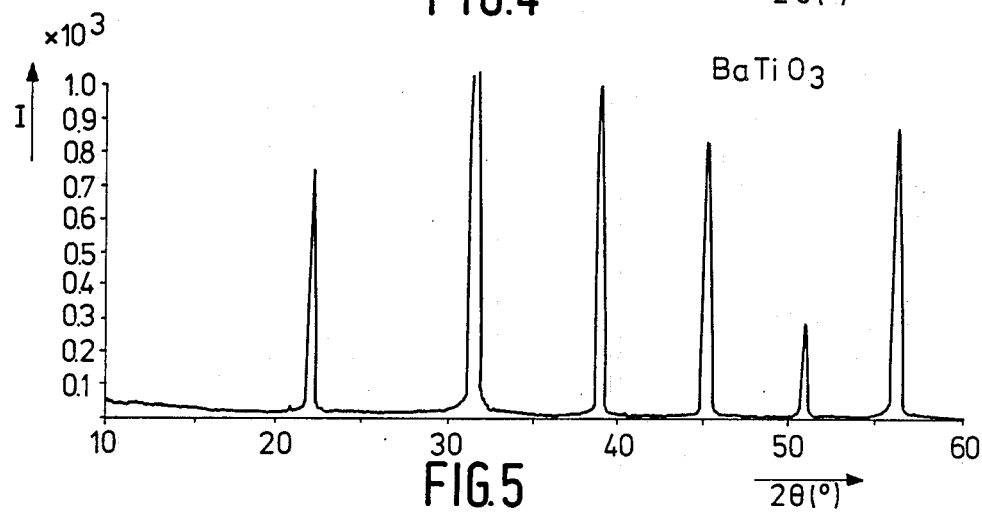

The X-ray diffraction diagram of FIG. 5 shows no other phases than BaTiO$_3$. In accordance with the small particle size the BaTiO$_3$ powder obtained has a cubic to pseudo cubic structure.

EXAMPLE 6.

Manufacture of (Ba$_{0.5}$Pb$_{0.5}$)TiO$_3$.

1. Manufacture of the gel:

50 g of tetrabutyl titanate Ti(OC$_4$H$_9$)$_4$ are mixed with 26.5 g of acetic acid CH$_3$COOH. The titanium content of the solution obtained is gravimetrically determined as TiO$_2$. 10 g of the solution contain 1.534 g of TiO$_2$ (corresponding to 0.0192 mol of Ti).

2.491 g of barium acetate Ba(CH$_3$COO)$_2$ and 3.698 g of lead-acetate Pb(CH$_3$COO)$_2$.3H$_2$O are dissolved at a raised temperature in 7.5 g of water and 4.69 g of acetic acid CH$_3$COOH. After cooling to room temperature the barium-lead-acetate solution is mixed with 10.152 g of the titanium-acetate solution.

In the resultant barium-lead-titanium-acetate solution the atomic ratio (Ba, Pb): Ti is approximately 1:1. After a Period of 8 to 9 hours at room temperature the barium-lead-titanium-acetate solution is converted into a transParent, ream-free, yelloWish gel. After calcination at a temPerature of 1000° C. the (Ba,Pb)TiO$_3$ content of such a gel is 0.2 g per 1 g of gel.

2. Manufacture of (Ba$_{0.5}$Pb$_{0.5}$)TiO$_3$ from the gel: 6.8 g of gel and 25 g of an aqueous solution of 6.25 g of tetramethyl ammonium hydroxide (CO$_3$)$_{4N}$—OH (corresponds to 25% by weight of tetramethyl ammonium hydroxide) are introduced into an inert synthetic resin vessel which can be closed and which is introduced into a steel container under pressure.

The arrangement corresponds to a commercially available device for carrying out chemical analyses, in which slightly soluble compounds are decomposed at raised temperatures.

The gel is heated for 17 hours at a temperature of 150° C. and at an excess pressure of approximately 5 bar. After completion of the reaction and cooling of the reaction mixture the liquid is decanted from the synthetic resin vessel and the precipitate is washed with hot (70° C.) water and, finally, with denatured ethanol. After drying a 98% field of very fine-grained (Ba$_{0.5}$Pb$_{0.5}$)TiO$_3$ having an average particle size of 0.1 μm is obtained.

Apart from a tetragonal perovskite phase the X-ray diffraction diagram shows no other phases.

What is claimed is:

1. A method of manufacturing a ceramic powder having the perovskite structure, said method comprising forming an aqueous solution consisting essentially of water and at least one alkaline earth metal salt and at least one salt of at least one metal selected from the group consisting of zirconium and titanium, adding a strong organic base, said base being an amine, to said solution to thereby form an aqueous suspension of said salts, heating said suspension at temperatures of from 70° C. to 150° C. to form a powder reaction product, separating out the resultant powder reaction product from said suspension and then removing any water adhering to said separated powder reaction product.

2. A method as claimed in claim 1, characterized in that barium dichloride (BaCl$_2$) is used as an alkaline earth metal salt.

3. A method as claim 1, characterized in that strontium dichloride ($SrCl_2$) is used as an alkaline earth metal salt.

4. A method as claimed in claim 1, characterized in that titanium oxychloride ($TiOCl_2$) is used as a titanium salt.

5. A method as claimed in claim 1, characterized in that zirconium oxychloride ($ZrOCl_2$) is used as a zirconium salt.

6. A method as claimed in claim 1, characterized in that tetramethyl ammonium hydroxide (($CH_3)_4N$—OH) is used as the amine.

7. A method as claimed in claim 1, characterized in that the alkaline-earth metal is substituted with lead in an amount up to 80 mol %

8. A method of manufacturing a ceramic powder having the perovskite structure, said method comprising, forming an alkaline earth metal-titanium acetate gel, forming a mixture of said gel and an aqueous solution of a strong organic base, said base being an amine, heating said mixture to a temperature of from 110° C. -180° C. to form a powder precipitate in an aqueous reaction mixture, separating said powder precipitate from the reaction mixture and removing any water adhering to said powder precipitate.

9. A method as claimed in claim 8, characterized in that barium-titanium-acetate gel is used as an alkaline-earth metal-titanium-acetate gel.

10. The method of claim 8 wherein the amine is tetramethyl ammonium hydroxide (($CH_3)_4N$—OH).

11. The method of claim 8 wherein the alkaline-earth metal is substituted with up to 80 mol % lead.

12. The method of claim 10 wherein the mixture is heated to a temperature of about 150° C. at a pressure of 5 bar.

* * * * *